United States Patent Office 2,801,924
Patented Aug. 6, 1957

2,801,924

PUDDING COMPOSITION AND PROCESS OF PRODUCING THE SAME

Adolph S. Clausi, Battle Creek, Mich., assignor to General Foods Corporation, New York, N. Y., a corporation of Delaware No Drawing. Application July 24, 1956,
Serial No. 599,700

27 Claims. (Cl. 99—139)

The present invention relates to the preparation of an instant pudding, and more particularly to a composition which when combined with cold water or milk will, within a relatively short period of time, result in a pudding having characteristics similar to those of a cooked starch pudding. This application is a continuation-in-part of United States application Serial No. 347,854, filed April 9, 1953, for Composition and Process.

The great bulk of puddings and similar desserts prepared in the past have been those of the starch type in which the desired consistency results from gelatinization of the starch and which requires, therefore, a fairly extended period of preparation.

One type of dessert which needs only a short time for preparation relies upon the action of the enzyme rennen in coagulating the protein content of milk to provide a gel. This type of dessert although easy of preparation does not have the desired consistency of a starch pudding and, moreover, is very fragile, subject to becoming liquid with handling.

Another milk protein coagulant which has recently been proposed is the combination of a tetraalkali pyrophosphate as the coagulant with a soluble calcium salt as a coagulation accelerator, but desserts prepared in this manner must be consumed shortly after preparation since they become rubbery or tough on standing.

In addition to the above-described types of desserts there has also been developed in recent years a starch pudding which relies on the use of pregelatinized starch and thereby eliminates the need for cooking by the housewife. This type of pudding, however, has not proved successful because although it is quick of preparation the excessive amount of starch required imparts a disagreeably starchy flavor and a pasty texture.

The object of the present invention is to provide a pudding or dessert with a consistency and texture similar to that of a cooked starch pudding which can be prepared quickly and simply without cooking, which will not be fragile and which, on the other hand, will not thicken unduly or otherwise deteriorate on standing for relatively long periods of time after preparation.

It has been found that a pudding of the desirable characteristics set forth immediately above can be provided when using an alkali pyrophosphate as a milk protein coagulant, if an alkali orthophosphate is used as a coagulation accelerator. Preferably, there is often employed a stiffening agent to give body to the texture of the pudding. Such a pudding can be prepared by the housewife in 5–10 minutes. The above description of the invention is intended to include the combination of an alkali pyrophosphate-alkali orthophosphate with the protein content of regular, skim, condensed, evaporated and all other types of milk and also with reconstituted dried milk protein. Thus, in the former case the phosphates would be dissolved and/or suspended in the milk and in the latter case the phosphates and dried milk solids containing milk protein would be dissolved and/or suspended in water or other suitable aqueous liquid.

While the alkali pyrophosphate when used alone will serve to coagulate the milk protein and provide a pudding of somewhat suitable texture and consistency, it is not practical to rely upon its use alone inasmuch as several hours are required for the gelation to occur or for the pudding to set up. For this reason, a coagulation or gelation accelerator is employed. With the alkali orthophosphates present in the system the gelation required for the pudding to set occurs within 5–10 minutes. It is known that a soluble calcium salt may serve this purpose but such a salt has the disadvantage that after gelation has occurred there is a continuation of the action of the coagulant and the accelerator with the result that the pudding acquires a very thick or heavy consistency to the point of becoming salvy. The coagulation accelerators to which the present invention is particularly directed are the alkali orthophosphates such as the mono-, di-, and trialkali orthophosphates. This is intended to include, of course, the orthophosphates of sodium, potassium, ammonium, cesium, rubidium and lithium. Of the various orthophosphates, the mono- and dialkali orthophosphates are preferred. The trialkali orthophosphates produce a pudding of inferior texture as compared with puddings provided by the other two orthophosphates. Of the mono- and dialkali orthophosphates those of sodium and potassium are preferred and disodium orthophosphate is more particularly preferred.

The alkali pyrophosphates which may be employed to coagulate the milk protein and thereby provide the gel upon which the pudding of the present invention is based include those of sodium, potassium, ammonium, rubidium, cesium and lithium. On the other hand, the alkali pyrophosphates occur in four different forms, e. g., the monosodium trihydrogen pyrophosphate, the disodium dihydrogen pyrophosphate, the trisodium monohydrogen pyrophosphate and the tetrasodium pyrophosphate. These are usually named in accordance with their alkali content so that the first phosphate is called monosodium pyrophosphate. Of these the tetraalkali pyrophosphate is the most preferred, especially the tetrasodium and the tetrapotassium pyrophosphate. The disodium and dipotassium pyrophosphates provide very suitable gels although the trisodium and tripotassium pyrophosphates provide weaker gels. The monalkali pyrophosphates are not obtainable commercially. However, based on limited data obtained with a laboratory sample this phosphate also provides a gel and when available in purer form will prove quite useful in the present invention.

As indicated above, it is preferred that a stiffening agent be employed along with the phosphates and the milk protein in the preparation of the type of gel to which the invention is directed. Such stiffening agents include starch and starch derivatives, natural gums and modifications thereof, cellulose derivatives, and the like. Such materials are characterized by being capable of increasing the viscosity of water and other aqueous systems and apparently act in pudding preparation in a manner somewhat related to this property.

Of the various stiffening agents, pregelatinized starch is by far the most preferred. For one thing, it is desired that the pudding of the present invention resemble a cooked, starch pudding as much as possible. Also, it is the most convenient to employ and does not cause gumminess in the pudding as do some of the gums discussed above when they are employed at relatively high levels. Any suitable pregelatinized edible starch may be employed such as the starches of potato, rice, wheat, corn, sago, tapioca, and the like. It is also possible, of course, to employ two or more of such starches in combination. In the case of sago starch best results are obtained if the raw starch is oxidized with hypochlorite solution before the step of pregelatinization. It may also be desirable that other starches be modified by any of the various well-known procedures in order to produce the best texture. Of the various pregelatinized starches that may be employed it is preferred to use a pregelatinized potato starch or tapioca starch which has been modified by the aforementioned oxidation or by acid hydrolysis prior to the step of pregelatinization.

While the particle size of the pregelatinized starch is not critical, there are preferred particle sizes or ranges of particle size, there being a different optimum for different kinds of starch and starches modified by different methods. It has been found that with potato starch the bulk of the starch should be fine enough to go through a 140 mesh screen, whereas with tapioca starch modified by the aforementioned hypochlorite or acid hydrolysis treatment the bulk of the starch should be fine enough to go through a 270 mesh screen for best results. Starch of larger particle size may result in somewhat slower cold water solubility and less uniform dispersion of the starch throughout the pudding.

The manner in which the stiffening agents are believed to function to add body to the pudding is that it competes with the milk gel being formed by the action of the pyrophosphate and orthophosphate for the available water in the pudding so that no "whey" remains after the protein of the milk has coagulated. This provides a gel of firmer consistency. For example, use of the alkali pyrophosphate and the alkali orthophosphate without a stiffening agent will provide at best a very delicate gel. The addition of a stiffening agent results in a pudding of thick consistency and texture similar to that of the aforementioned cooked-starch pudding. Moreover, the use of a stiffening agent permits wider variations in the levels at which the phosphates need to be employed.

The levels at which the phosphates and, for example, the pregelatinized starch may be employed with respect to each other and the amount of milk protein employed vary considerably but there are preferred ratios or levels at which they are best employed. In the case of the pyrophosphate coagulant, the amount of tetrasodium pyrophosphate which should be combined with a pint of milk in order to obtain a relatively quick setting pudding may range from about 1 gram to over 4 grams, the lower limit being determined by the time required for the pudding to set and the upper limit being determined by taste considerations. It has been found that the total amount of phosphates that should be combined with a pint of milk should not exceed about 5 grams because at this level the pudding may begin to acquire an objectionable taste. Similar considerations apply to the use of the coagulation accelerator which may be employed from about 0.5 gram to about 4.0 grams per pint of milk in the case of the disodium orthophosphate. The lower limit is determined by the rate of set. Use of less than this amount of the orthophosphate results in excessive periods of time being required for the pudding to set up. The upper limit of the orthophosphate is determined by the same considerations mentioned above in connection with the pyrophosphate coagulant, namely, objectionable taste. While the above data concerning phosphate levels have been given with respect to particular sodium phosphates, it is understood that adjustments will be necessary in using other alkali phosphates because of variations in molecular weights.

In addition to the above considerations, it would also appear that there is an interrelationship between the ratios or levels at which the pyrophosphate coagulant is employed and that at which the orthophosphate accelerator is used. As aforementioned, the minimum amount of tetrasodium pyrophosphate coagulant which it is preferred to employ with a pint of milk is about 1 gram. The minimum amount of disodium orthophosphate accelerator which should be employed in the same system for best results is about ½ gram. Thus, at the lower levels it is best that the amount of the accelerator be not less than one-half the amount of the coagulant if the pudding is to set rapidly. At the higher levels the pudding will set up in 5 minutes using 4 grams of the tetrasodium pyrophosphate and 1 gram of the disodium orthophosphate. On the other hand, with a pint of milk 1 gram of tetrasodium pyrophosphate and 0.5 gram of disodium orthophosphate results in a pudding after 30 minutes, 1 gram of the same coagulant and 2 grams of the same accelerator provide a pudding in 10 minutes, 1 gram of said coagulant and 3 grams of said accelerator provide a pudding in 5 minutes and 1.5 grams of coagulant and 5.0 grams of accelerator provide a pudding in about 3 minutes. The latter pudding had an off-flavor due to excessive phosphate. Moreover, the rate of set sufficient to provide a pudding in less than 5 minutes may be undesirably high since it may not give the average housewife sufficient time to conveniently handle the pudding before setting.

The process of preparing the pudding of the present invention is carried out in a very simple manner by admixing the phosphate-starch composition containing sugar, coloring and flavoring as desired with milk. As aforementioned, it is possible to use dried milk protein along with the other ingredients of the dry composition and in such a case the desired pudding can be obtained simply by admixing the pudding ingredients with water, fruit juice, and the like. A sufficient degree of mixing is obtained by stirring with a spoon. It is preferred, of course, from the standpoint of convenience to use a mechanical mixer such as an egg beater. Mixing in this more vigorous manner usually results in the inclusion of air into the mix which may be objectionable if the creamy type of texture is that desired. The incorporation of air can be prevented by the use of any suitable foam depressant such as a vegetable oil, for example, coconut oil. On the other hand, if the chiffon-like texture is that desired it may be obtained readily, even in the presence of a foam depressant, by mixing the pudding composition with milk or water at about 32° F.

The pH of the aqueous system involved in the preparation of the pudding of the present invention is not particularly critical. It is recognized, of course, that excessive amounts of acid or base will prove detrimental. It is preferred to employ a pH within the range of about 6.5–7.8.

The temperature of the aqueous system involved is capable of wide variation, excellent puddings being obtained within the temperature range from about 32° F. to about 90° F. The texture of puddings prepared at temperatures appreciably in excess of 90° F. become softer as the temperature employed becomes higher. It is possible, however, to harden puddings prepared at such higher temperatures by the use of refrigeration but this requires additional time and serves to defeat the objective of having an instant pudding and lumpiness results.

Sucrose and other sugars may be employed along with various flavoring and coloring ingredients. It is preferred to employ the sucrose in relatively finely divided form, a suitable commercial form of sucrose being so-called "coating sugar."

Specific examples of the composition of the present invention in the form of a dry mix are set forth in the following table and relate to a vanilla and a chocolate pudding, respectively:

| Ingredients | Vanilla, gm. | Chocolate, gm. | Vanilla, gm. | Vanilla, gm. |
|---|---|---|---|---|
| Coating Sugar | 66.5 | 65.5 | 66.5 | 66.5 |
| Color | 0.3 | 0.4 | 0.3 | 0.3 |
| Vanilla Flavoring | 2.5 | 1.4 | 2.5 | 2.5 |
| Pregelatinized Potato Starch | 20.0 | 26.0 | 20.0 | 20.0 |
| Tetrasodium Pyrophosphate Anhydrous Powdered | 1.5 | 1.5 | | |
| Disodium Dihydrogen Pyrophosphate Anhydrous Powdered | | | 2.0 | |
| Trisodium Hydrogen Pyrophosphate Anhydrous Powdered | | | | 2.0 |
| Disodium Phosphate Anhydrous Powdered | 1.5 | 3.0 | 2.0 | 2.0 |
| Cocoa | | 16.0 | | |
| | 92.3 | 113.4 | 93.3 | 93.3 |

Any of the dry compositions set forth above are added to 1 pint of milk, preferably chilled to a temperature of about 40° F., and distributed throughout the milk by agitating with an egg beater for about 1 minute. Thereafter, the pudding may be poured into individual serving dishes and allowed to set or, if desired, it may simply be allowed to remain in the bowl. In either event, the pudding sets up to the consistency and texture of a cooked-starch type of pudding in about 5 minutes.

The composition set forth herein for the preparation of puddings in accordance with the present invention has been described for the most part as being in the form of a dry powder but it is obvious that the same may also be employed in the form of a paste or liquid simply by the incorporation of an appropriate amount of water provided that the milk protein is not included in such composition. Moreover, while the present invention has been described with particular reference to specific embodiments the same are not to be considered as being in any way limitative but rather reference should be had to the appended claims for a definition of the invention.

Herein and in the appended claims the term "milk protein" is intended to include all of the protein naturally occurring in regular milk, particularly casein which is the major protein ingredient, and the salts naturally occurring in milk. Purified casein and lactalbumen are inoperative.

What is claimed is:

1. A composition for use in preparing a pudding by interaction with milk protein comprising the combination of an alkali pyrophosphate and an alkali orthophosphate.

2. The composition of claim 1 in which the alkali pyrophosphate is a tetraalkali pyrophosphate.

3. The composition of claim 1 in which the alkali pyrophosphate is a trialkali pyrophosphate.

4. The composition of claim 1 in which the alkali pyrophosphate is a dialkali pyrophospate.

5. The composition of claim 1 in which a pudding stiffening agent is present with the phosphates.

6. A pudding comprising the reaction product of the composition of claim 1 with milk protein and water.

7. A pudding comprising the reaction product of the composition of claim 5 with milk protein and water.

8. A composition for use in preparing a pudding by interaction with milk protein comprising the combination of an alkali pyrophosphate, and alkali orthophosphate and a pregelatinized starch.

9. The composition of claim 8 in which the alkali for use in preparing a pudding by pyrophosphate is a tetraalkali pyrophosphate.

10. The composition of claim 8 in which the alkali for use in preparing a pudding by pyrophosphate is a trialkali pyrophosphate.

11. The composition of claim 8 in which the alkali for use in preparing a pudding by pyrophosphate is a dialkali pyrophosphate.

12. A pudding comprising the reaction product of the composition of claim 8 with milk protein and water.

13. A pudding comprising the reaction product of the composition of claim 9 with milk protein and water.

14. A pudding comprising the reaction product of the composition of claim 10 with milk protein and water.

15. A pudding comprising the reaction product of the composition of claim 11 with milk protein and water.

16. The composition of claim 8 in which the ingredients are combined in the following ratio: Tetraalkali pyrophosphate equivalent to 1–4 parts by weight of tetrasodium pyrophosphate, alkali orthophosphate equivalent to 0.5–4 parts by weight of disodium orthophosphate and 10–30 parts by weight of a pregelatinized starch.

17. A pudding comprising the reaction product of the composition of claim 16 with that amount of milk protein contained in about 500 parts by weight of regular milk in the presence of that amount of water contained in about 500 parts by weight of regular milk.

18. The pudding of claim 12 in which the milk protein is that of ordinary milk.

19. The pudding of claim 12 in which the milk protein is dried milk protein.

20. The composition of claim 8 in the form of a dry mix employing tetrasodium pyrophosphate and a sodium orthophosphate.

21. The composition of claim 16 in the form of a dry mix employing tetrasodium pyrophosphate and disodium orthophosphate.

22. The composition of claim 16 in which the ingredients are combined in the following ratio: 1.5 parts by weight of tetrasodium pyrophosphate, 1.5 parts by weight of disodium orthophosphate and 20–30 parts by weight of a pregelatinized tapioca starch.

23. A dry mix for use in preparing a pudding by interaction with milk protein comprising 1.5 parts by weight of tetrasodium pyrophosphate, 1.5 parts by weight of disodium orthophosphate, 20 parts by weight of a pregelatinized tapioca starch, about 65 parts by weight of coating sugar, and about 2.5 parts by weight of vanilla flavoring.

24. A dry mix for use in preparing a pudding by interaction with milk protein comprising 1.5 parts by weight of tetrasodium pyrophosphate, 3.0 parts by weight of disodium orthophosphate, 26 parts by weight of a pregelatinized tapioca starch, about 65 parts by weight of coating sugar, about 16 parts by weight of cocoa powder, and about 1.4 parts by weight of vanilla flavoring.

25. A dry mix for use in preparing a pudding by interaction with milk protein comprising a tetraalkali pyrophosphate, an alkali orthophosphate, a pregelatinized starch and dried milk protein.

26. A process for preparing a pudding which comprises admixing in aqueous solution milk protein, an alkali pyrophosphate, an alkali orthophosphate and pregelatinized starch, and allowing the same to set.

27. The process of claim 26 in which the ingredients are combined in the ratio of that amount of milk protein contained in about 500 parts by weight of regular milk, tetraalkali pyrophosphate equivalent to 1–4 parts by weight of tetrasodium pyrophosphate, alkali orthophosphate equivalent to 0.5–4 parts by weight of disodium orthophosphate and 10–30 parts by weight of a pregelatinized starch in the presence of that amount of water contained in about 500 parts by weight of regular milk.

References Cited in the file of this patent

UNITED STATES PATENTS 2,554,143    Hinz et al.    May 22, 1951
2,607,692    Kennedy et al.    Aug. 19, 1952